March 29, 1932.  P. P. HENSHALL  1,851,765
VALVE CONTROLLED RADIATOR

Filed July 3, 1930  4 Sheets-Sheet 1

INVENTOR
Percival P. Henshall
BY Chas. McE. Chapman
ATTORNEY

March 29, 1932.    P. P. HENSHALL    1,851,765
VALVE CONTROLLED RADIATOR
Filed July 3, 1930    4 Sheets-Sheet 4

Percival P. Henshall INVENTOR
BY Chas. McC. Chapman
ATTORNEY

Patented Mar. 29, 1932

1,851,765

UNITED STATES PATENT OFFICE

PERCIVAL P. HENSHALL, OF PHILADELPHIA, PENNSYLVANIA, ASSIGNOR TO JOHN J. NESBITT, INC., OF PHILADELPHIA, PENNSYLVANIA, A CORPORATION OF NEW JERSEY

VALVE CONTROLLED RADIATOR

Application filed July 3, 1930. Serial No. 465,497.

This invention has reference to the art of heating and ventilating, and particularly relates to a valve controlled radiator adapted for use in a heating and ventilating unit, and capable of controlling the temperature of space in which the unit is installed by regulating automatically the capacity of the radiator.

Heretofore it has been proposed to regulate the temperature of the air of the room in which an installation is made by introducing into the room, through a heating and ventilating unit, regulated quantities of hot or cold air or a mixture of hot and cold air, the air itself being primarily treated or not treated by a radiator according to the conditions existing in the room of installation. In most instances, the heating and ventilating unit has been provided with dampers regulated thermostatically under the influence of motors or electrical means as an actuating medium, and in some instances the dampers have been regulated by hand operated mechanical devices. These mechanisms have not always been satisfactory, and especially in cases where a radiator has been used controlled either by hand or thermostatically.

It has also been proposed to utilize a two-radiator construction embodied in a ventilating unit, the separate radiators being controlled thermostatically to regulate the flow of the heating fluid. Such structure has proved unsatisfactory because the thermostatic valve closes one of the radiators completely, allowing the other to remain in action, on a predetermined rise of temperature. On a further rise of temperature in the room of installation of the unit, the second radiator will close gradually, said second radiator thus receiving only enough of the heating fluid to travel a portion of the length of the radiator, resulting in a volume of warm air flowing from one end of the unit and a volume of cold air flowing from the other end of the unit. This and all other systems known to me cause drafts and objectionable currents and eddies of air within the room of installation of the unit due to the changing temperatures in the several parts of the room.

Thermostatic regulation of dampers, thermostatic regulation of radiators under the conditions noted, and the regulation of cold air entering the unit and passing through or around the radiator have been found to be extremely difficult and unsatisfactory, and in consequence great difficulty has been experienced in maintaining even approximately uniform room temperature, and especially in school buildings and other public structures wherein the rooms are unusualy large and the ceilings high. It is among the objects of my invention to avoid all the foregoing structures and the many objections and difficulties pertaining thereto, and to provide a radiator for use in heating and ventilating units, and for various other uses and purposes, which will obviate all objections, overcome all difficulties, and with which a well-nigh perfect heating and ventilating unit can be provided as well as a radiator which overcomes all objections regardless of where or how it is used.

Broadly, it is among the objects of my invention to provide a radiator which is under control of a plurality of valves, which may be mechanically, electrically or thermostatically controlled; to provide a radiator with a pluraity of groups of valves controlled as noted, any or all of which groups of valves may be activated according to the conditions required in the room of installation; and to provide a radiator with valvular controls which may be regulated so as to produce to a nicety the degree of heat required in a given installation.

With the above objects in view and others which will be detailed during the course of this description, my invention consists in the parts, features, elements and combinations thereof hereinafter described and claimed.

In order that my invention may be clearly understood, I have provided drawings wherein.

Figure 1:
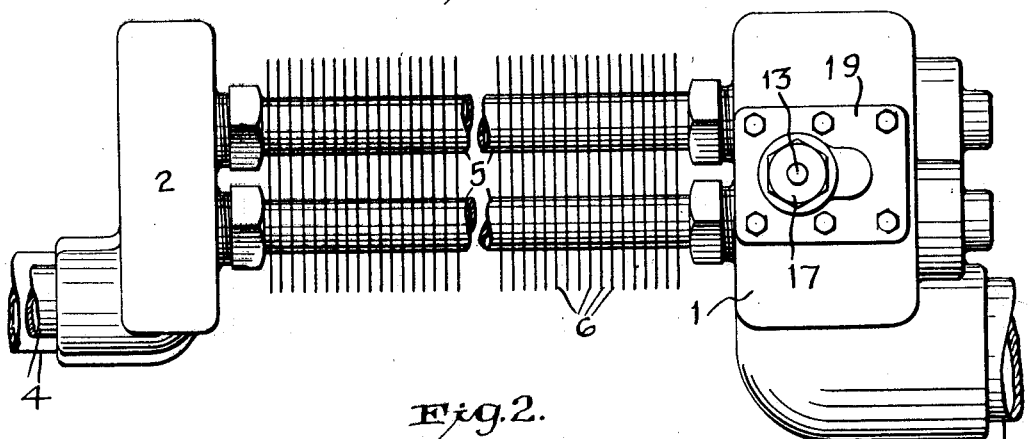
Figure 1 is a view in front elevation of a radiator embodying my invention, the figure being broken in the middle due to the limitations of the sheet, and in order to convey the idea of indefinite length of the tubular radiating members.
Figure 2:
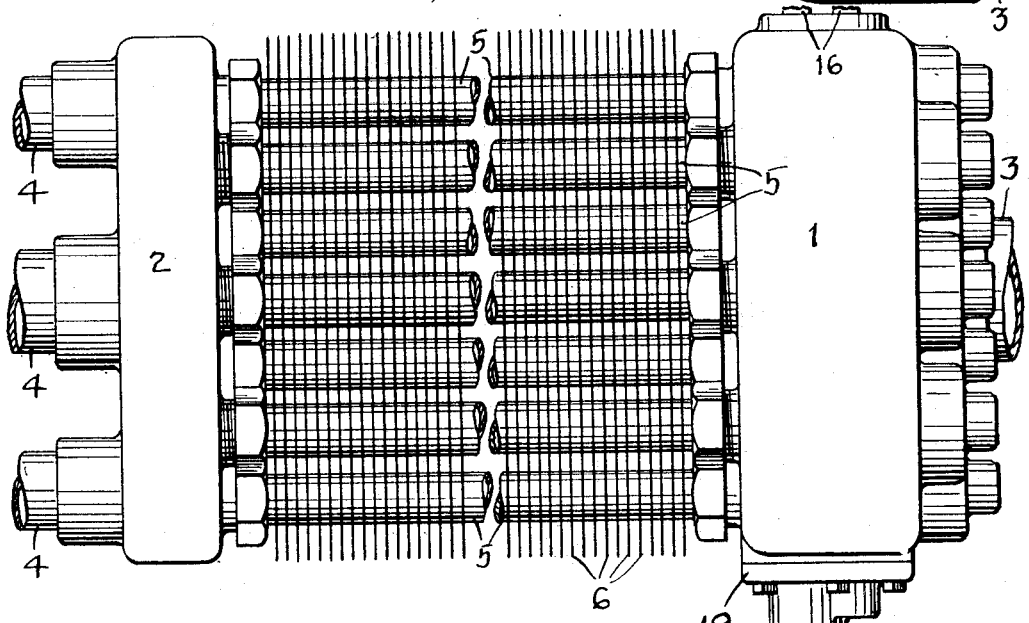
Figure 2 is a top plan view of the structure shown in Figure 1, embodying a plurality of controlled radiator units as an example of my invention.
Figure 3:
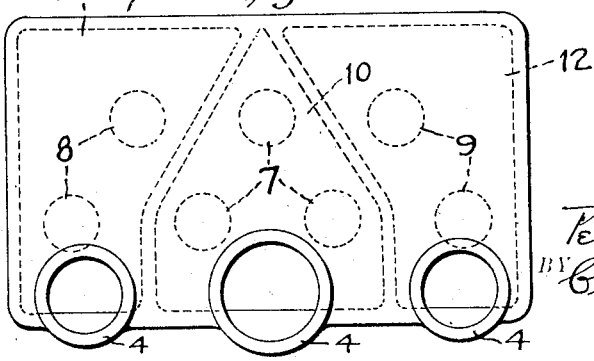
Figure 3 is a view in end elevation of the return end or header of my radiator.

Referring to the drawings, the numeral 1 indicates the header at the feed end of the radiator and 2 the header at the return end of the radiator. The supply pipe is indicated at 3, the return pipes at 4, the radiator tubes at 5, and the radiating fins or plates at 6, generally in Figures 1 and 2. The grouping of the radiator tubes is shown in Figure 3, and therein a central group is shown in triangular relation and indicated by 7, and two side groups are indicated at 8 and 9, respectively. The group 7 is partitioned in a chamber 10, group 8 is partitioned in a chamber 11 and group 9 is partitioned in a chamber 12 of the return header. Hence, for the purposes of my invention, there are three groups of radiator tubes, with radiating fins, connecting the headers 2 and 3 and controlled, respectively, by groups of valves and tappets for regulating the flow of the heating fluid or cutting off said flow. This grouping is merely suggestive both in matter of number and arrangement, and is not to be taken as a limitation of my invention.

Referring now to Figures 4 to 7, inclusive, it will be seen that the feeding-in header 1 is provided with a plurality of shafts 13, 14, the former being the driving shaft, and the latter being a counter shaft, and the two being geared together at 15 for simultaneous operation. The shaft 13 may be activated mechanically, electrically, or thermostatically under proper control, the regulation being according to the temperature of the room or space of installation of the unit or radiator. The two shafts are mounted in any suitable way in the header, as by tapped in bearings 16, including a stuffing box 17, and an ordinary centralizing bearing 18 in a detachable plate 19 bolted to the header. Thus when the driving shaft 13 is activated the counter shaft 14 will be driven, and the two shafts will actuate a plurality of tappets arranged along the length of the shafts and indicated, respectively, by the group numbers 7ª, 8ª and 9ª corresponding with the grouping of the radiation tubes 5. Each tappet consists of a collar 20 provided with an extended, bifurcated finger 21 projecting in the proper direction for engagement with the hub of a poppet valve indicated by the group numbers 7ᵇ, 8ᵇ and 9ᵇ, respectively, corresponding with the grouping of the radiation tubes 5. Each collar 20 is provided with a semicircular groove 22, in which operates a pin 23 carried by the shafts 13 and 14, respectively, it being understood that the tappets are loose on the shafts and are each intended to have movements independently of the shafts under the control of a torsional spring 24 coiled about the shafts, and one end of which is fixed to the shaft, and the other end of which is fixed in the collar. The springs keep the tappets normally in contact with the pins 23 carried by the shafts. To prevent lateral displacement of the tappets, the prongs of bifurcated fingers 21 embrace or straddle the shafts 25 of the valves, this structure also enabling the tappets to move relatively to the shaft 25 without actuating the latter. Normally, the position of the shafts 25 is controlled by the springs 26 surrounding the inner end of the shafts within the tapped in bearings 27 along the length of the headers. Within the bearings 27 the shafts 25 have a double support, one in the bearing and the other in a collar 28, adjacent a plug 29 tapped in the end of the bearing 27, this construction enabling the poppet valves to be readily removed and replaced in the headers. Each of the poppet valves consists of a ground valve-head 30 adapted to engage a seat 31 in the header and provided with a more or less elongated sleeve 32 engaged by the tappet fingers 21. Thus, primarily, or normally, the valve-head 30 is held unseated or open by the spring 26, which latter, in the matter of its expansive strength, is slightly weaker than the torsional strength of the springs 24 controlling the tappets, for the functional purposes presently described. The tubes 5 are held in the headers in any suitable manner, as by being extended into externally threaded bosses 33, on which are set nuts 34 which hold the tubes 5 in place. This is a detail of construction with which my invention is not concerned, which fact is also true of the means for holding the opposite ends of the springs 24, as shown by the detail in Figure 7.

Figure 4:
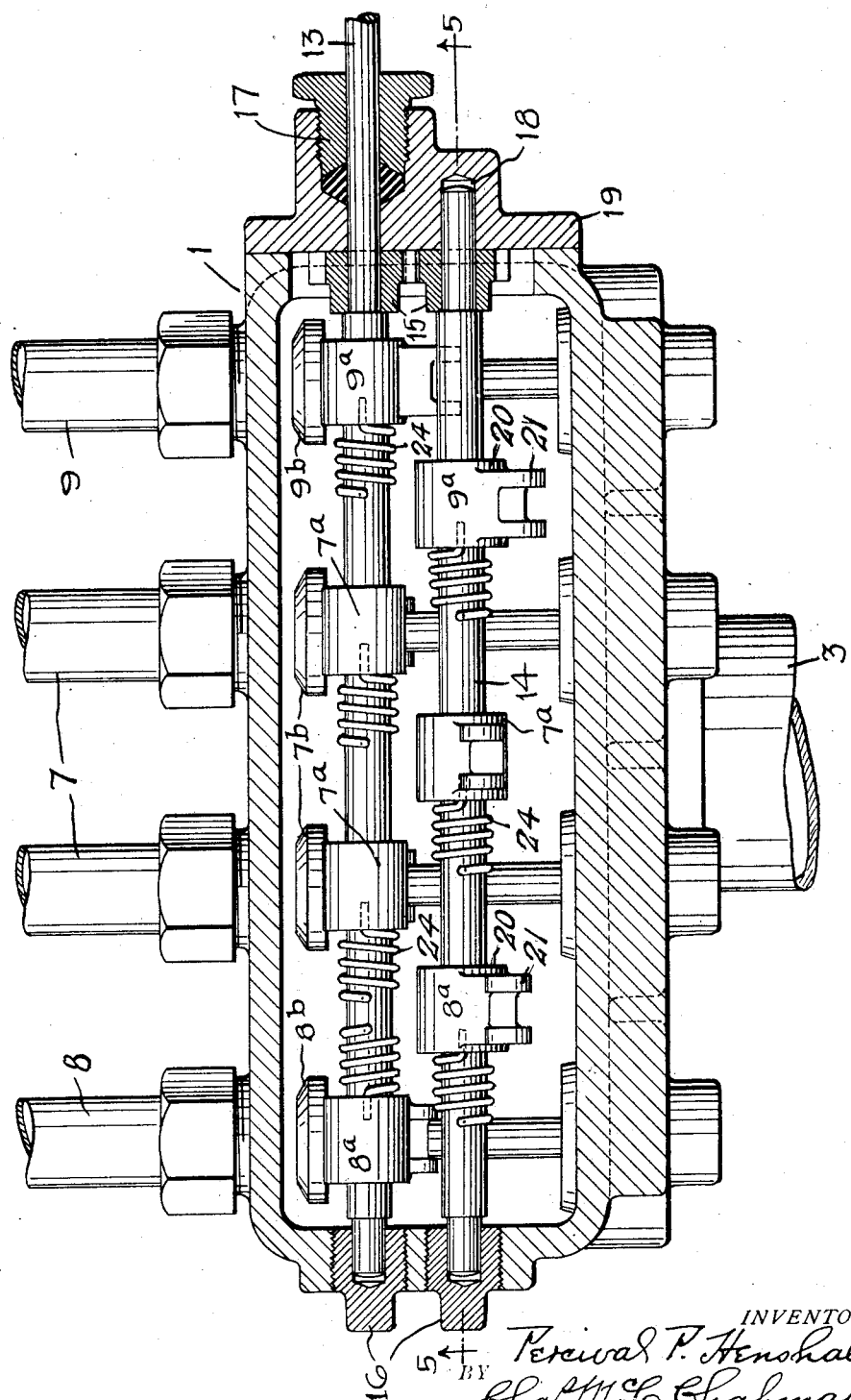
Figure 4 is a sectional view taken on the line 4—4 of Figure 6 looking in the direction of the arrows.
Figure 5:
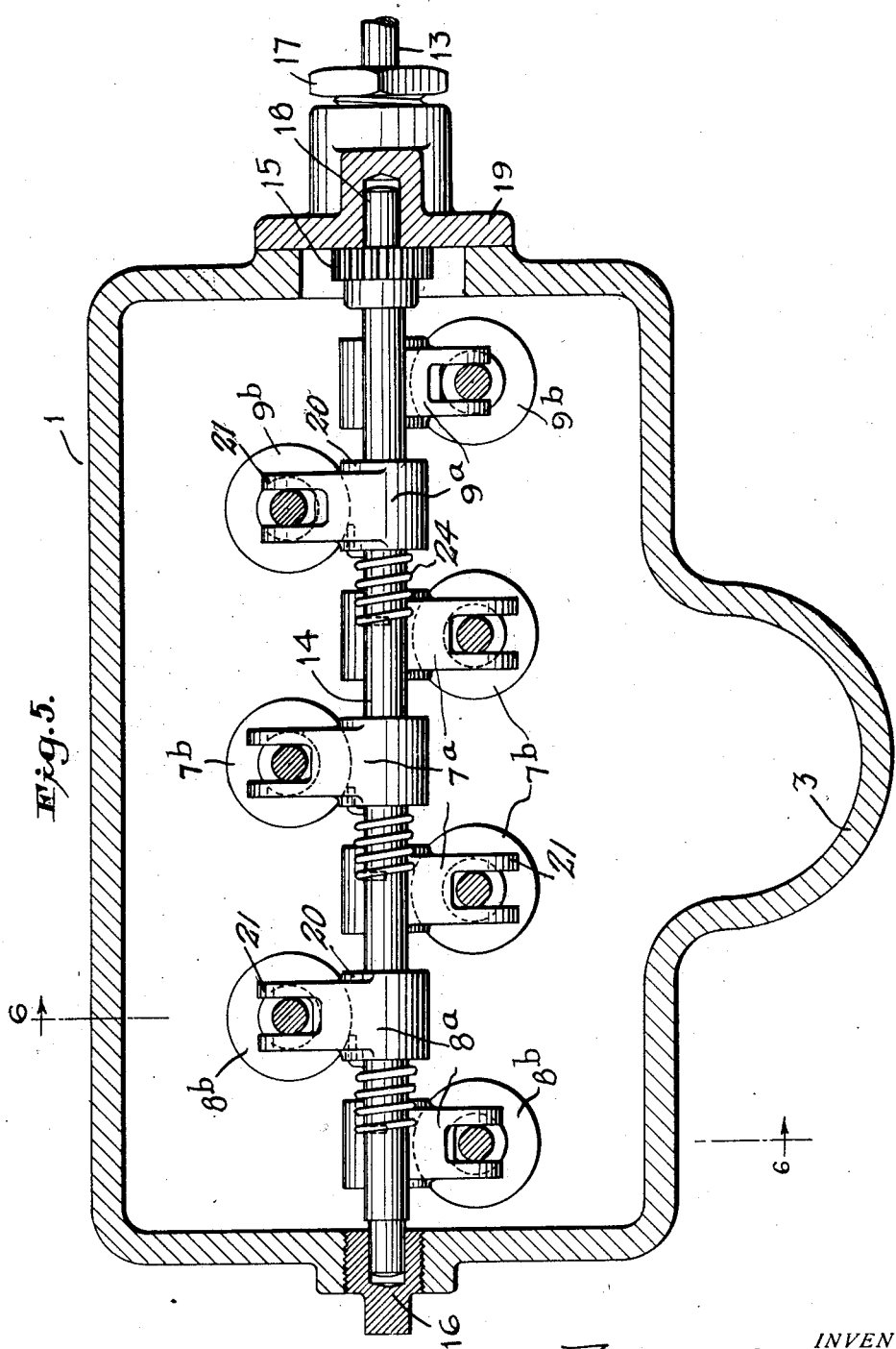
Figure 5 is a sectional view taken on the line 5—5 of Figure 4 looking in the direction of the arrows.
Figure 6:
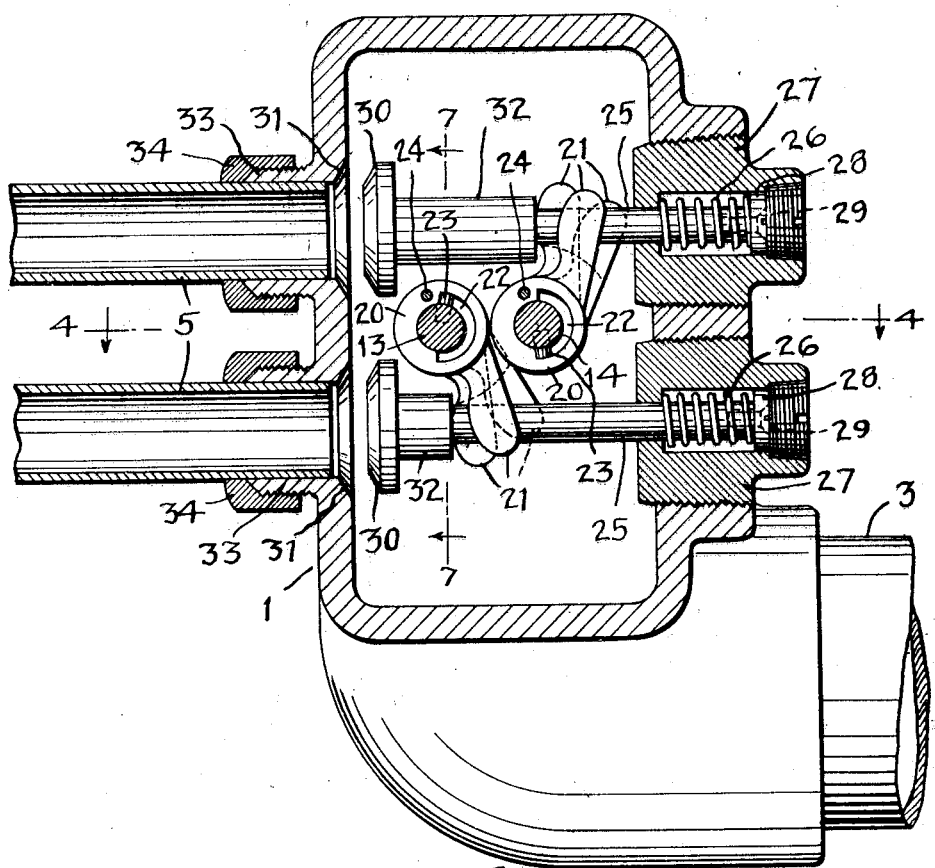
Figure 6 is a sectional view taken on the line 6—6 of Figure 5.
Figure 7:
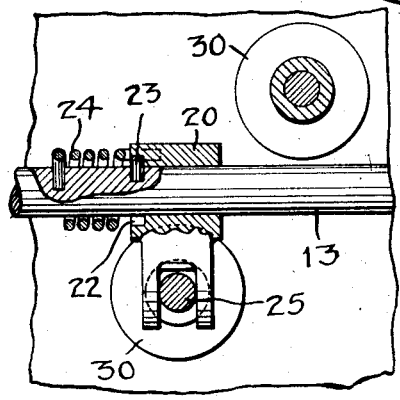
Figure 7 is a sectional view of a detail on the line 7—7 of Figure 6.

In order to avoid confusion, I have confined the group numerations 7, 8 and 9 to Figures 3 and 4, the other reference characters indicating details of construction being employed in the other figures of the drawings. According to the valve, tappet and tube aggroupments, I may control the flow of the heating fluid through any number of tube and plate radiations, and for the purpose of illustrating my invention I have shown such aggroupment to consist of three tubes arranged centrally within the chamber 10, two tubes arranged in staggered relation within the chamber 11, and two tubes arranged in staggered relation within the chamber 12, each tube of these aggroupments having its controlling poppet valve and tappet in the feed-in header. The return header has the segregated chambers and the respective groups of tubes pass through the header to either a common or independent trap, in order that there can be no regurgitation of the heating fluid into the return header.

With the foregoing details of construction in mind, the following mode of operation will be readily understood:

Assuming extreme weather in the winter, the radiator would be so regulated thermostatically through the medium of the driving shaft 13, in turn actuating the counter shaft 14, as to have all its poppet valves of the respective groups wide open to the passage of the heating fluid, so as to obtain the full heating capacity of the radiator. When the temperature of the space being heated reaches the maximum for which the thermostatic or other control is regulated, one or the other of the groups of valves will be actuated by the tappets through the medium of the driving and counter shafts to close the valves and shut off the flow of heating fluid to that particular group. When the room temperature falls to another predetermined degree, the regulator will reopen the group of valves allowing the heating fluid to flow therethrough, thus restoring the room temperature to the predetermined maximum. If the weather be comparatively warm, the said group of valves first closed may remain closed and another group of valves may be closed, thus cutting down still more the flow of fluid through the radiator tubes; and the third group of valves may likewise subsequently be closed until the temperature of the room is reduced to the low maximum for which the controlling means is set, whereupon one or the other or a plurality of the groups of valves may go into action either simultaneously or successively, according to wether the drop of temperature in the room is rapid or slow. I have indicated, for example, the central group of valves 7$^b$ actuated by the tappets 7$^a$ and controlling the tubes 7 to be the first group to be influenced by the thermostatic regulating means; but, either one of the other groups may be regulated to go into action first, and the others so regulated as to go into action either simultaneously or successively. The torsional springs 24, as previously stated, are slightly stronger than the springs 26, which normally hold the valves open, and said springs 24 are compensatory for the purpose of holding the valves to their seats after the tappets have forced that condition and at the same time for the purpose of yielding to enable the tappets to reverse their action on their supporting shafts within the limits of the cooperating slot and pin connection 22—23. In other words, the springs will normally hold the tappets in contact with the sleeves 32 of the valves so that, when the shafts are actuated, there will be no lost motion between the tappets and the valves, and when the tappets have forced the valves to their seats through the medium of the pins 23, overcoming the power of the springs 26, the springs will still so act upon the tappets as to hold the valves to their seats against the expansive force of the springs 26. In this way, I am able to primarily so set the tappets on their respective shafts as to control the action of groups of valves in precisely the manner required for any given installation or for any functional purpose; and this control is to the extent of compensating for the irregularities which may occur in the setting of the tappets as the result of the personal equation, or such irregularities as may result in workmanship in connection with the sleeves of the valves and the tappets, and such other irregularities as may result from wear or other causes which cannot be humanly calculated. My invention, therefore, contemplates the use of a plurality of groups of valves, regardless of the number of valves in each group, and regardless of the disposition of the groups of valves, arranged within a radiator in such wise as to control the operation of one or more fluid conduit tubes, or one or more groups of fluid conduit tubes so as to control to a nicety the heating capacity of the radiator. My invention also contemplates, in connection with the controlling valves, a compensating means which tends to eliminate defects resulting both from bad mechanics and poor adjustments, in the operation of the valves and in the control of the radiating surface or area of a radiator. Hence, I do not wish to be limited to details of construction or mechanical devices, since such as have been shown in the drawings and disclosed herein are to be taken as examples merely and not limitations of my invention.

It will be understood that, if my radiator is used in a heating and ventilating unit, air passing through the latter from the outside to the inside of the building, or as the result of recirculation, is immediately changed in temperature to the extent desired, by contact with the radiation tubes and plates, according to the groups of radiation tubes which are in operation, thus obviating the necessity of trying to mix a warm stratum of air with a cold stratum of air to increase the temperature of the incoming air, whether such effort be within the unit or at the point of discharge of the air from the unit into the room of installation. This has invariably been found to be difficult and drafts, currents and eddies most always result within the room. Also, with my radiator, excessive rises of temperature are obviated, and the temperature of a predetermined space can be more nearly regulated by controlling areas of radiation as distinguished from controlling volumes of hot and cold air during rapid passage under suction or drive through a ventilating unit.

Having thus described my invention, what I claim and desire to secure by Letters Patent is:

1. A radiator having a header and within said header a group of valves for closing simultaneously a group of radiator tubes, and means for controlling the operation of said valves including compensating means.

2. A radiator comprising a feed-in header, a return header, and a plurality of fluid transmission tubes connecting said headers, valves for controlling the passage of fluid through said tubes arranged within one of the headers, and means exterior of the header for automatically controlling the action of said valves in groups.

3. A radiator comprising a feed-in header, a return header, and a plurality of transmission tubes connecting said headers, valves mounted in the feed-in header and so arranged as to control a group of the transmission tubes, and means including geared shafts for actuating the valves.

4. A radiator comprising a feed-in header, a return header, and a plurality of transmission tubes connecting said headers, valves mounted in one of the headers and arranged so as to control a group of the transmission tubes, and means including geared shafts, tappets mounted loosely thereon, and springs controlling the tappets, for actuating the valves.

5. A radiator having a header at each end and in one of its headers a plurality of valves arranged in a plurality of groups, and means for actuating the respective groups of valves according to predetermination.

6. A radiator having in one of its headers, a plurality of valves arranged in a plurality of groups, and means for yieldingly actuating the respective groups of valves according to predetermination, said means including compensatory devices for taking care of irregularities in structure.

7. A radiator having in one of its headers a plurality of valves arranged in a plurality of groups, and means for actuating the respective groups of valves according to predetermination, including shafts on which the valves are mounted, geared together driving and counter shafts, and tappets carried by the shafts for engaging the valves.

8. A radiator having, in one of its headers, a plurality of valves arranged in a plurality of groups, and means for actuating the respective groups of valves including yieldingly actuated tappets engaging the valves.

9. A radiator having, in one of its headers, a plurality of valves arranged in a plurality of groups, and means for actuating the respective groups of valves including springs for normally controlling the valves, and yielding means for directly engaging the valves.

10. A radiator composed of two headers and a plurality of fluid conduit tubes, one of the headers being divided into segregated chambers, and the tubes being arranged to enter the respective chambers in predetermined groups, and valves cooperating with said tubes to control the passage of fluid therethrough, and means for actuating the valves.

PERCIVAL P. HENSHALL.